(12) United States Patent
Takashiba

(10) Patent No.: US 11,846,554 B2
(45) Date of Patent: Dec. 19, 2023

(54) INSTALLATION STRUCTURE FOR OIL PRESSURE SENSOR

(71) Applicant: SUZUKI MOTOR CORPORATION, Hamamatsu (JP)

(72) Inventor: Yasuto Takashiba, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 0 days.

(21) Appl. No.: 18/156,260

(22) Filed: Jan. 18, 2023

(65) Prior Publication Data

US 2023/0251155 A1 Aug. 10, 2023

(30) Foreign Application Priority Data

Feb. 10, 2022 (JP) ................. 2022-019256

(51) Int. Cl.
| | | |
|---|---|---|
| G01L 19/00 | (2006.01) | |
| F01M 11/10 | (2006.01) | |
| F01M 11/03 | (2006.01) | |
| G01L 19/06 | (2006.01) | |
| F01M 11/02 | (2006.01) | |

(52) U.S. Cl.
CPC ......... G01L 19/0007 (2013.01); F01M 11/02 (2013.01); F01M 11/03 (2013.01); F01M 11/10 (2013.01); G01L 19/0636 (2013.01); F01M 2011/031 (2013.01); F01M 2250/60 (2013.01)

(58) Field of Classification Search
CPC . G01L 19/0007; G01L 19/0636; F01M 11/02; F01M 11/03; F01M 11/10; F01M 2011/031; F01M 2250/60
See application file for complete search history.

(56) References Cited

U.S. PATENT DOCUMENTS

| | | | |
|---|---|---|---|
| 2009/0116155 A1* | 5/2009 | Almalki | F01D 21/00 340/963 |
| 2010/0300795 A1 | 12/2010 | Adachi et al. | 180/291 |
| 2014/0174398 A1* | 6/2014 | Burgess | F16K 15/16 123/196 CP |

FOREIGN PATENT DOCUMENTS

| | | | |
|---|---|---|---|
| CN | 207018045 U | * | 2/2018 |
| CN | 115585032 A | * | 1/2023 |
| JP | 2013204487 A | * | 10/2013 |
| JP | 5345448 B2 | | 11/2013 |

* cited by examiner

Primary Examiner — Syed O Hasan
(74) Attorney, Agent, or Firm — Stein IP, LLC

(57) ABSTRACT

There is provided an installation structure for an oil pressure sensor, including: a crankcase in which a main gallery that extends in one direction is formed; and the oil pressure sensor detachably installed on an outer surface of the crankcase. The oil pressure sensor is configured to detect an oil pressure of a branch passage branching from one end of the main gallery. In a bottom view of a vehicle, a connector of the oil pressure sensor is oriented to an outside of the vehicle, and the connector of the oil pressure sensor overlaps with the crankcase.

6 Claims, 11 Drawing Sheets

INSTALLATION STRUCTURE FOR OIL PRESSURE SENSOR

CROSS-REFERENCE TO RELATED APPLICATIONS

This application is based on Japanese Patent Application No. 2022-019256 filed on Feb. 10, 2022, the contents of which are incorporated herein by way of reference.

TECHNICAL FIELD

The present invention relates to an installation structure for an oil pressure sensor.

BACKGROUND

For the purpose of high output, low fuel consumption, and decreased exhaust gas, a variable valve timing system is employed, which controls an opening and closing timing of a valve by a variable valve device according to an operating state of an engine. As the variable valve timing system, there is a system in which an oil control valve installed on an outer surface of a cylinder head controls an oil pressure to the variable valve device (see, for example, Patent Literature 1). An oil pressure sensor is attached in a middle of an oil passage from an oil supply source to the oil control valve, and detects an oil pressure of an oil supplied from the oil control valve to the variable valve device.

Patent Literature 1: JP5345448B

However, depending on an installation position of the oil pressure sensor with respect to the engine, the oil pressure sensor may be damaged when a vehicle is inverted. In addition, when contaminations in the oil adhere to the oil pressure sensor, detection accuracy is reduced, but regular maintenance is difficult depending on the installation position of the oil pressure sensor.

The present invention is made in view of the above problem, and an object of the present invention is to provide an installation structure for an oil pressure sensor capable of suppressing damage to the oil pressure sensor when a vehicle is inverted and improving maintainability of the oil pressure sensor.

SUMMARY

There is provided an installation structure for an oil pressure sensor, including: a crankcase in which a main gallery that extends in one direction is formed; and the oil pressure sensor detachably installed on an outer surface of the crankcase. The oil pressure sensor is configured to detect an oil pressure of a branch passage branching from one end of the main gallery. In a bottom view of a vehicle, a connector of the oil pressure sensor is oriented to an outside of the vehicle, and the connector of the oil pressure sensor overlaps with the crankcase.

DESCRIPTION OF EMBODIMENTS

In an installation structure for an oil pressure sensor according to one aspect of the present invention, a main gallery that is long in one direction is formed in a crankcase. An oil pressure sensor is detachably installed on an outer surface of the crankcase, and the oil pressure sensor detects an oil pressure of a branch passage branching from one end of the main gallery. A connector of the oil pressure sensor is oriented to an outside of a vehicle on one end side of the main gallery in a bottom view of the vehicle, and thus the oil pressure sensor can be easily removed from the crankcase. By periodically removing contaminations adhering to the oil pressure sensor, detection accuracy of the oil pressure sensor can be improved. In addition, since the connector of the oil pressure sensor overlaps with the crankcase, it is possible to suppress the oil pressure sensor from being damaged when the vehicle is inverted.

Embodiments

Figure 1:
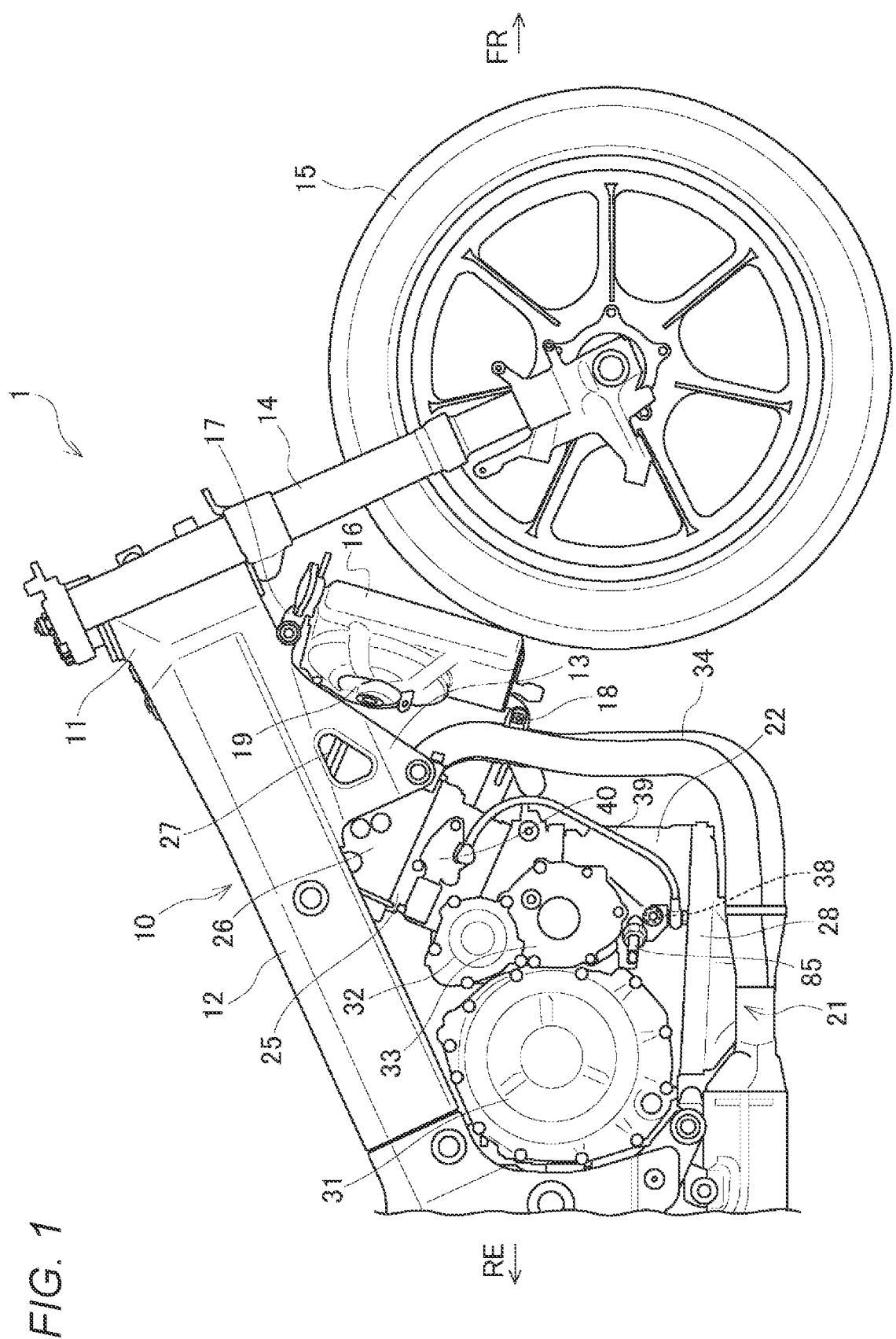
FIG. 1 is a right side view of a front portion of a vehicle according to the present embodiment.

Hereinafter, the present embodiment will be described in detail with reference to the accompanying drawings. FIG. 1 is a right side view of a front portion of a vehicle according to the present embodiment. In addition, in the following drawings, an arrow FR indicates a vehicle front side, an arrow RE indicates a vehicle rear side, an arrow L indicates a vehicle left side, and an arrow R indicates a vehicle right side.

As shown in FIG. 1, a straddle-type vehicle 1 includes various components such as an engine 21 and an electrical system mounted on a twin spar vehicle body frame 10. The vehicle body frame 10 includes a pair of main frames 12 that are branched to left and right sides from a head pipe 11 and extend rearward, and a pair of down frames 13 that extend downward from front portions of the pair of main frames 12. The pair of main frames 12 are curved so as to pass over the engine 21 and wrap around to the rear of the engine 21. An upper side and a rear side of the engine 21 are suspended by the pair of main frames 12, and a front side of the engine 21 is suspended by the pair of down frames 13.

A front fork 14 is steerably supported on the head pipe 11 via a steering shaft (not shown). A front wheel 15 is rotatably supported on a lower portion of the front fork 14. A radiator (heat exchanger) 16 that dissipates heat from cooling water of the engine 21 is provided in front of the engine 21. An upper portion of the radiator 16 is supported on the main frames 12 via an upper bracket 17, and a lower portion of the radiator 16 is supported on the engine 21 via a lower bracket 18. A cooling fan 19 that takes in hot air from the radiator 16 when the vehicle is stopped is attached to a rear surface of the radiator 16.

The engine 21 is a parallel 4-cylinder engine in which four cylinders are arranged in a left-right direction, and includes a crankcase 22 housing a crankshaft (not shown). A cylinder assembly in which a cylinder 25, a cylinder head 26, and a cylinder head cover 27 are laminated is attached to an upper portion of the crankcase 22. An oil pan 28 in which oil for lubrication and cooling is stored is attached to a lower portion of the crankcase 22. Engine covers such as a clutch cover 31 and starter gear covers 32 and 33 are attached to a left side surface of the crankcase 22. A plurality of exhaust pipes 34 extend downward from a front surface of the engine 21.

The engine 21 is mounted with a hydraulically controlled variable valve timing system that controls an opening and closing timing of an intake valve (not shown). A variable valve device 60 (see FIG. 9) is housed inside the cylinder head 26 and the cylinder head cover 27, and an oil control valve 40 is installed on an outer surface of the cylinder 25. The variable valve device 60 and the oil control valve 40 are connected through various oil passages in the engine 21. Since the oil control valve 40 controls an oil pressure to the variable valve device 60, the opening and closing timing of the intake valve is changed based on the oil pressure to the variable valve device 60.

An oil pressure sensor 85 is installed on the crankcase 22 of the engine 21, and detects an oil pressure of an oil passage in the crankcase 22. Oil in the oil passage contains contaminations, and when the contaminations adhere to the oil pressure sensor 85, a detection accuracy of the oil pressure sensor 85 is reduced. In order to periodically remove and clean the oil pressure sensor 85, the oil pressure sensor 85 is installed at a location in the crankcase 22 where the oil pressure sensor 85 can be easily removed. In addition, the oil pressure sensor 85 is installed at a position where not only the ease of removal of the oil pressure sensor 85 but also damage when the vehicle is inverted is considered.

Therefore, in an installation structure of the oil pressure sensor 85 according to the present embodiment, the oil pressure sensor 85 is detachably installed by using a dead space formed at the lower portion of the crankcase 22. Since the oil pressure sensor 85 is oriented to the outside of the vehicle, the oil pressure sensor 85 can be easily removed, thereby improving maintainability. In addition, the oil pressure sensor 85 is installed so as not to largely protrude outward from the crankcase 22 in a vehicle width direction, thereby suppressing the oil pressure sensor 85 from being damaged when the vehicle is inverted. In this way, the oil pressure sensor 85 is installed at a position in the crankcase 22 where a detachability and a protection property are considered.

Figure 2:
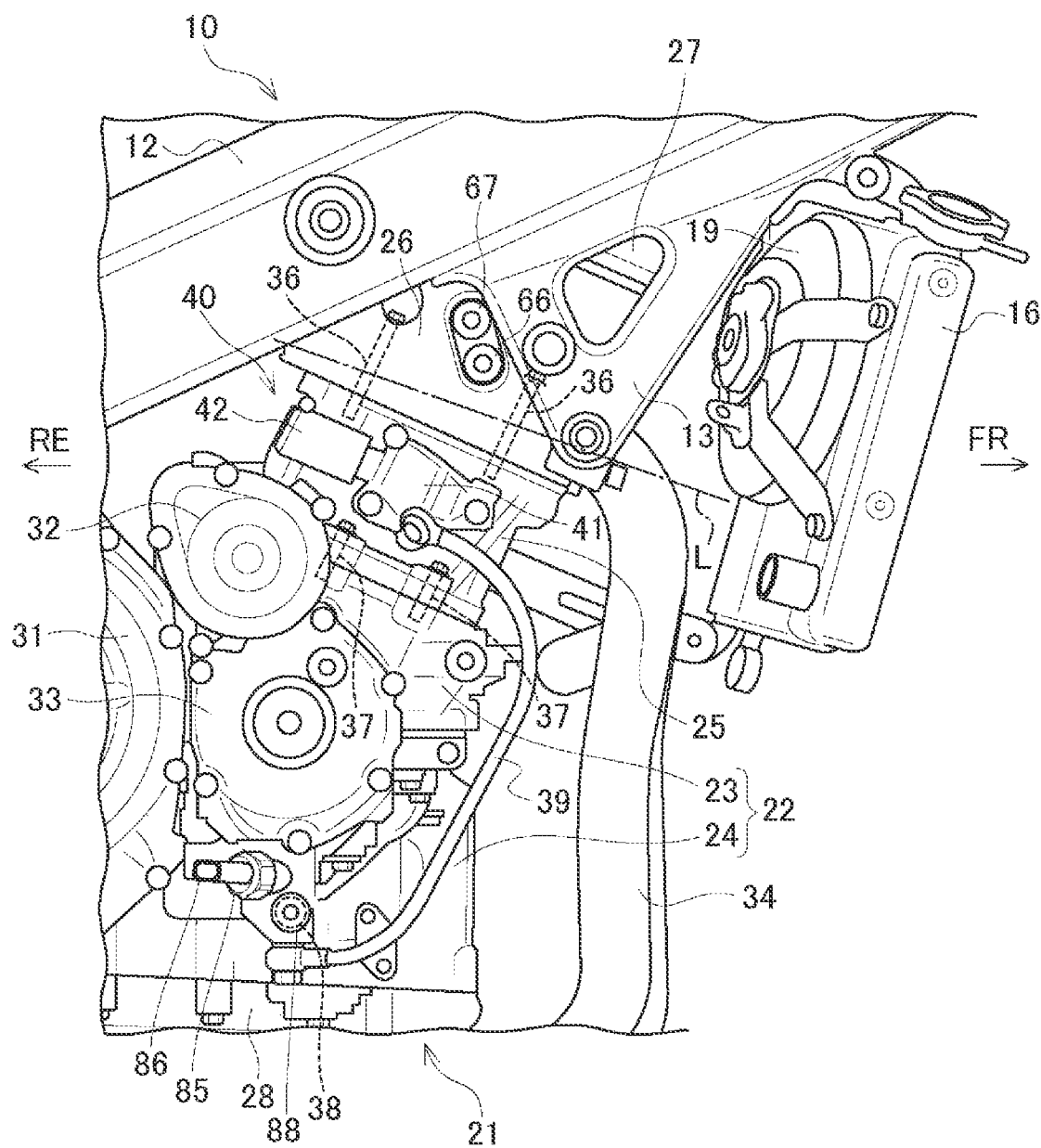
FIG. 2 is a right side view of a periphery of an engine according to the present embodiment.
Figure 3:
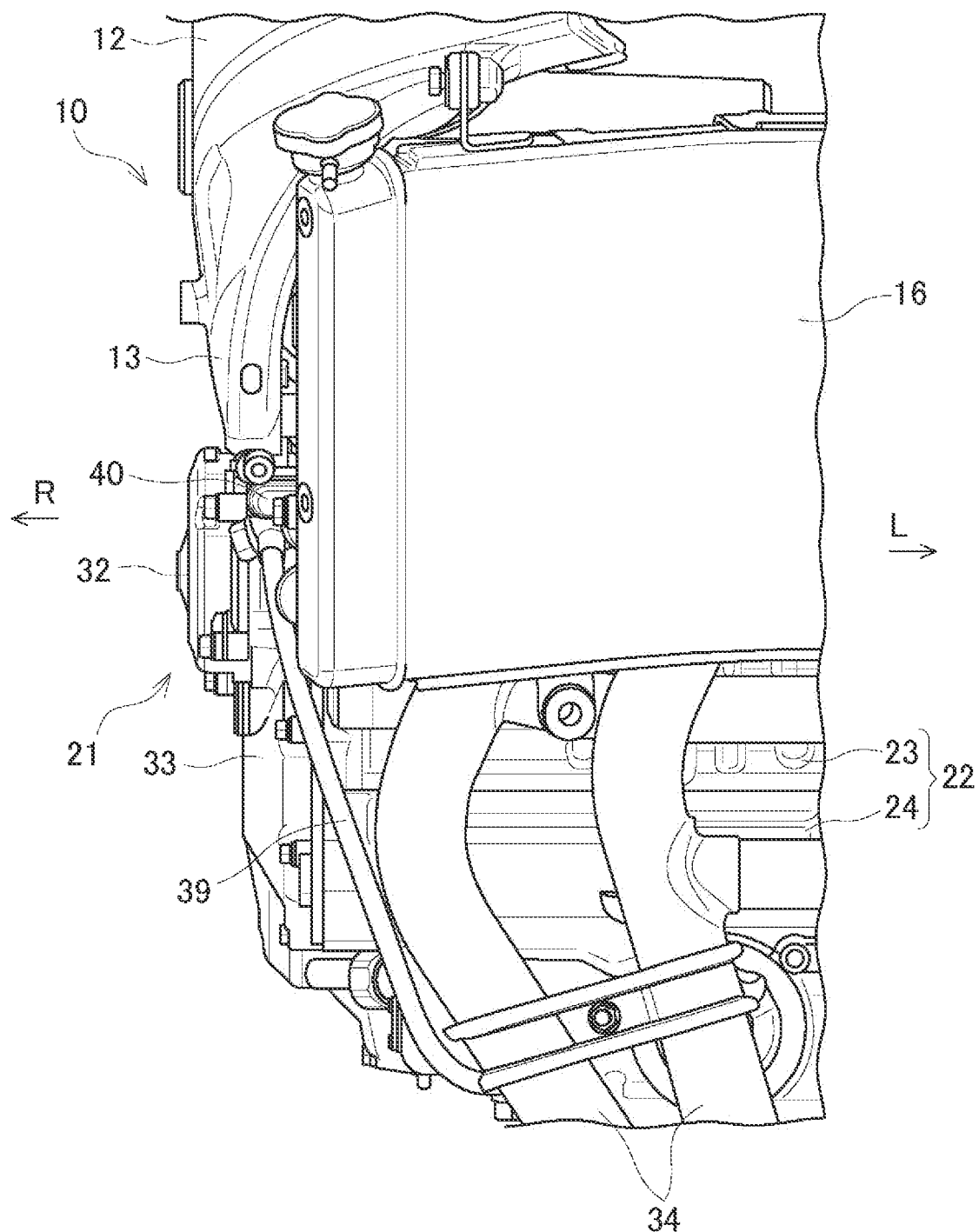
FIG. 3 is a front view of the periphery of the engine according to the present embodiment.

A layout of an oil control valve will be described with reference to FIG. 2 and FIG. 3. FIG. 2 is a right side view of a periphery of an engine according to the present embodiment. FIG. 3 is a front view of the periphery of the engine according to the present embodiment.

As shown in FIG. 2, the crankcase 22 of the engine 21 has a vertically divided structure including an upper case 23 and a lower case 24. Various shafts such as a crankshaft are supported on a mating surface of the upper case 23 and the lower case 24. The oil pan 28 is fixed to a lower surface of the lower case 24, and the cylinder 25 is fixed to an upper surface of the upper case 23. The cylinder head 26 is fixed to an upper surface of the cylinder 25, and the cylinder head cover 27 is fixed to an upper surface of the cylinder head 26. The cylinder head 26 and the crankcase 22 are suspended on the vehicle body frame 10.

A front side portion of the vehicle body frame 10 branches into the main frames 12 and the down frames 13. Each main frame 12 obliquely crosses a side of the cylinder head 26 from the upper surface to a rear surface, and each down frame 13 is formed in a substantially triangular shape in a side view such that a front-to-rear width narrows downward. The main frame 12 covers a rear side of the cylinder head 26 from the side, and the down frame 13 covers a front side of the cylinder head 26 from the side. The rear side of the cylinder head 26 is suspended on a middle portion of the main frame 12 in an extension direction, and the front side of the cylinder head 26 is suspended on a lower head portion of the down frame 13.

In a side view of the vehicle, a triangular region (region) surrounded by a lower edge of the main frame 12, a rear edge of the down frame 13, and a lower surface of the cylinder head 26 is formed on a side surface of the cylinder head 26. Although the triangular region of the cylinder head 26 is laterally exposed from between the main frame 12 and the down frame 13, the triangular region is not wide enough for the oil control valve 40. Therefore, the oil control valve 40 is installed on a right side surface (outer surface) of the cylinder 25 below the triangular region of the cylinder head 26. The side surface of the cylinder 25 is formed by an outer wall of a cam chain chamber 58 (see FIG. 6).

A pair of plug caps 66 and 67 that close insertion openings for a pair of oil pipes 64 and 65 (see FIG. 5) to be described later are installed in the triangular region of the cylinder head 26. Since the plug caps 66 and 67 avoid the vehicle body frame 10 in the side view of the vehicle, the oil pipes 64 and 65 can be attached and detached by the plug caps 66 and 67 even when the engine 21 is suspended on the vehicle body frame 10, thereby improving the maintainability. Since the plug caps 66 and 67 are installed along the rear edge of the down frame 13, there is no need to change a shape of the down frame 13. In this case, the plug cap 67 on the vehicle rear side is positioned above the plug cap 66 on the vehicle front side, and the plug caps 66 and 67 are partially overlapped with each other in an up-down direction, so that an installation region of the plug caps 66 and 67 is narrowed.

The oil control valve 40 is formed in a substantially cylindrical shape by a valve housing 41 in which a valve spool (not shown) is housed and a solenoid 42 that advances and retracts the valve spool. The oil passage in the oil control valve 40 is switched by advancing and retracting the valve spool by the solenoid 42. The oil control valve 40 is tilted such that an axial direction of the oil control valve 40 is parallel to a mating surface of the cylinder head 26 and the cylinder 25. The solenoid 42 is provided on a rear side of the valve housing 41 and positioned above the valve housing 41.

Contaminations such as a metal powder may occur inside the valve housing 41, but it is difficult for the contaminations to enter the solenoid 42 from the valve housing 41. That is, since the oil control valve 40 is tilted such that the solenoid 42 is above the valve housing 41, the contaminations are suppressed from being carried from the valve housing 41 to the solenoid 42 by the oil. Since the contaminations do not accumulate on a solenoid 42 side, damage to the oil control valve 40 due to the contaminations is suppressed. Details of the oil control valve 40 will be described later.

Since the oil control valve 40 is installed on the outer surface of the cylinder 25, the oil control valve 40 does not interfere with the vehicle body frame 10 on which the cylinder head 26 is suspended. Therefore, the vehicle body frame 10 does not protrude outward in the vehicle width direction, and an increase in a size of the straddle-type vehicle 1 is suppressed. In addition, since a center of gravity of the engine 21 is located in the crankcase 22, the oil control valve 40 is brought closer to the center of gravity of the engine 21. Therefore, propagation of vibration from the crankcase 22 to the oil control valve 40 is reduced, and a durability of the oil control valve 40 is improved.

In the side view of the vehicle, the cylinder head 26 and the cylinder 25 are fixed by two bolts 36 on both sides of a cylinder axis, and the cylinder 25 and the crankcase 22 are fixed by two bolts 37 on the both sides of the cylinder axis. The oil control valve 40 is installed so as not to overlap with these four bolts 36 and 37, and the oil control valve 40 is suppressed from protruding outward in the vehicle width direction. In this case, an interval between the two bolts 36 on an upper side is wider than an interval between the two bolts 37 on a lower side, and the oil control valve 40 is positioned near the cylinder head 26.

The starter gear covers 32 and 33 that cover starter gears (not shown) from the sides are provided below the oil control valve 40. The clutch cover 31 that covers a clutch (not shown) from the side is provided behind the starter gear covers 32 and 33. An upper portion of the starter gear cover 32 protrudes toward the cylinder 25, but interference between the starter gear cover 33 and the solenoid 42 is suppressed. Although the starter gear covers 32 and 33 and the clutch cover 31 are formed as separate engine covers, the starter gear covers 32 and 33 and the clutch cover 31 may be formed as one engine cover.

As shown in FIGS. 2 and 3, the starter gear covers 32 and 33 and the clutch cover 31 bulge outward from the side surface of the cylinder 25 in the vehicle width direction. In a front view of the vehicle, the oil control valve 40 is positioned inside the starter gear covers 32 and 33, the clutch cover 31, and the down frame 13 in the vehicle width direction. In addition, the oil control valve 40 is positioned between the starter gear covers 32 and 33 and the down frame 13. The oil control valve 40 is protected by the starter gear covers 32 and 33, the clutch cover 31, and the down frame 13 when the vehicle is inverted.

A main gallery 38 that is long in the vehicle width direction is formed in the lower portion of the crankcase 22. The main gallery 38 supplies oil from an oil pump (not shown) to each part of the engine 21 such as a journal bearing (not shown) of a crankshaft. The main gallery 38 and the oil control valve 40 are connected by an external pipe 39. One end (lower end) of the external pipe 39 is connected to a right side (one side in the vehicle width direction) of the main gallery 38, and the other end (upper end) of the external pipe 39 is connected to the oil control valve 40 installed on a right side surface of the engine 21 (cylinder 25).

Since an oil for valve timing control requires a high oil pressure, the oil is directly supplied from the main gallery 38 to the oil control valve 40 through the external pipe 39. The oil is fed from the main gallery 38 to the oil control valve 40 without passing through an oil passage in the crankcase 22 from the main gallery 38. Accordingly, a pressure loss in the oil passage is reduced, and an oil having a high oil pressure is supplied to the oil control valve 40. The external pipe 39 may include a pipe, or may include a pipe and a tube.

In the side view of the vehicle, the one end of the external pipe 39 is fixed to the lower portion of the crankcase 22 via a union bolt (see FIG. 2). The external pipe 39 extends from the main gallery 38 to the vehicle front side, wraps around the crankcase 22 from the lower side behind each exhaust pipe 34 and extends upward, and is bent toward the vehicle rear side below the down frame 13. The other end of the external pipe 39 is fixed to the oil control valve 40 via a union bolt. In this way, the external pipe 39 is positioned below the down frame 13 on a right side of the engine 21. Since the external pipe 39 is shortened, a pressure loss is reduced and operation accuracy of the variable valve device 60 is improved, and it is easy to correspond to a bank angle and the like.

In the front view of the vehicle, the engine covers such as the starter gear covers 32 and 33 and the clutch cover 31 are attached to a right side surface of the crankcase 22 (see FIG. 3). The exhaust pipe 34 extends downward from a front surface of the cylinder head 26 above the crankcase 22, and the one end (lower end) of the external pipe 39 is covered with the exhaust pipe 34 from a front side. The external pipe 39 protrudes toward the right side (one side in the vehicle width direction) from a back side of the exhaust pipe 34, and extends toward the oil control valve 40 through between various engine covers and the exhaust pipe 34.

Since the external pipe 39 is located inside the various engine covers in the vehicle width direction, the external pipe 39 is protected by the various engine covers and the down frame 13 when the vehicle is inverted. In addition, although the one end of the external pipe 39 is close to a road surface, the one end of the external pipe 39 is protected by the exhaust pipe 34. Further, the external pipe 39 is separated from the exhaust pipe 34 without protruding rightward from the various engine covers. Since an influence of a heat from the exhaust pipe 34 on the external pipe 39 is suppressed and the external pipe 39 is cooled by traveling wind, an increase in an oil temperature inside the external pipe 39 can be suppressed.

The oil pressure sensor 85 is detachably installed on an outer surface of the crankcase 22. The oil pressure sensor 85 detects the oil pressure of the oil passage formed in the crankcase 22. The oil pressure sensor 85 not only detects an oil pressure near the one end of the external pipe 39 to monitor an oil pressure in the external pipe 39 in order to control a variable valve timing, but also monitors an oil pressure in the engine 21 in order to supply an oil for lubrication to each part of the engine 21. Since the oil pressure sensor 85 is located inside the various engine covers in the vehicle width direction, the oil pressure sensor 85 is protected by the various engine covers and the down frame 13 when the vehicle is inverted.

The radiator 16 having a rectangular shape in the front view is provided in front of the cylinder head 26. The radiator 16 is tilted such that the upper portion is located forward of the lower portion. The radiator 16 is a round radiator curved into an arch shape in a top view, and the cooling fan 19 is attached to the rear surface of the radiator 16 on an oil control valve side (right side) in the vehicle width direction. In the front view of the vehicle, the oil control valve 40 is installed outside the radiator 16 in the vehicle width direction and below the down frame 13, and it is difficult for the radiator 16 and the down frame 13 to block the traveling wind in front of the oil control valve 40.

Since the oil control valve 40 is a solenoid valve, the oil control valve 40 is likely to generate heat when the solenoid 42 is energized. Therefore, the oil control valve 40 is cooled by the traveling wind, so that deterioration of operability of the variable valve device 60 due to temperature rise of the oil control valve 40 and the oil is suppressed. As described above, the solenoid 42 is positioned at the rear side of the valve housing 41, and the solenoid 42 is separated from the radiator 16. The heat from the radiator 16 is less likely to be transmitted to the solenoid 42, and temperature rise of the solenoid 42 is suppressed.

In the side view of the vehicle, a lower end of the down frame 13 is positioned on an extension line L extending from a lower end of the cooling fan 19 in a blowing direction, and the oil control valve 40 is positioned below the extension line L. Exhaust air from the radiator 16 is less likely to hit the oil control valve 40, and the deterioration of the operability of the variable valve device 60 due to the temperature rise of the oil control valve 40 and the oil is suppressed. In addition, in the front view of the vehicle, the solenoid 42 of the oil control valve 40 is covered by the down frame 13, and the exhaust air from the radiator 16 is blocked by the down frame 13 to suppress the temperature rise of the solenoid 42.

Figure 4A:
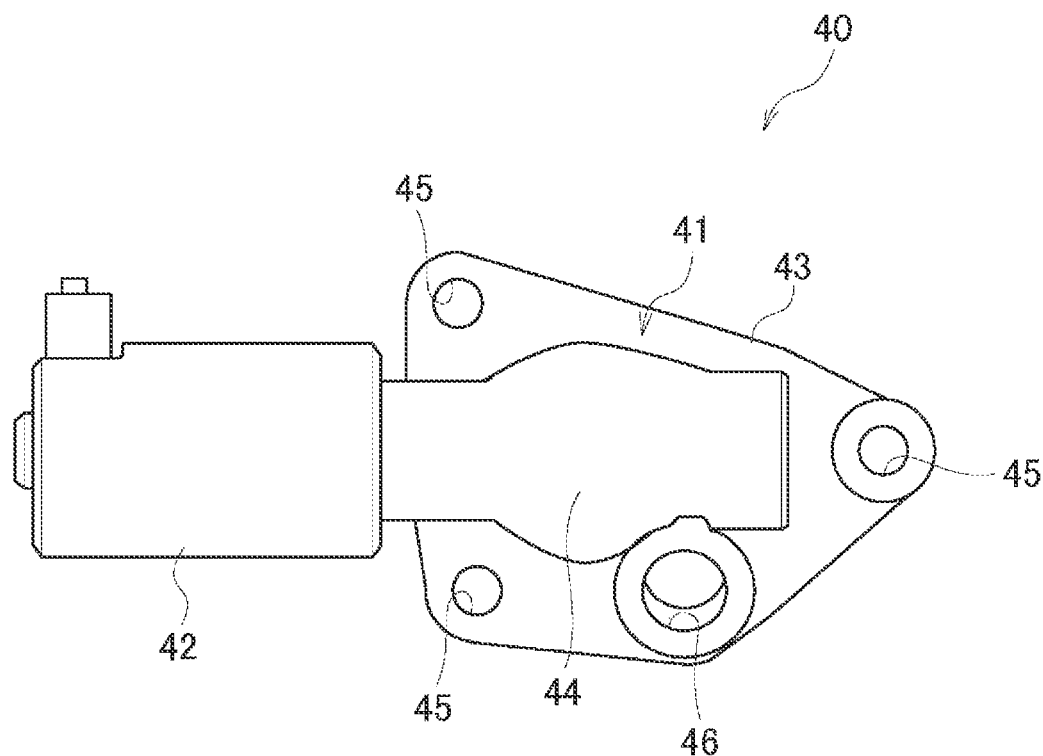
FIG. 4A and FIG. 4B are front view and rear view of an oil control valve according to the present embodiment.
Figure 4B:
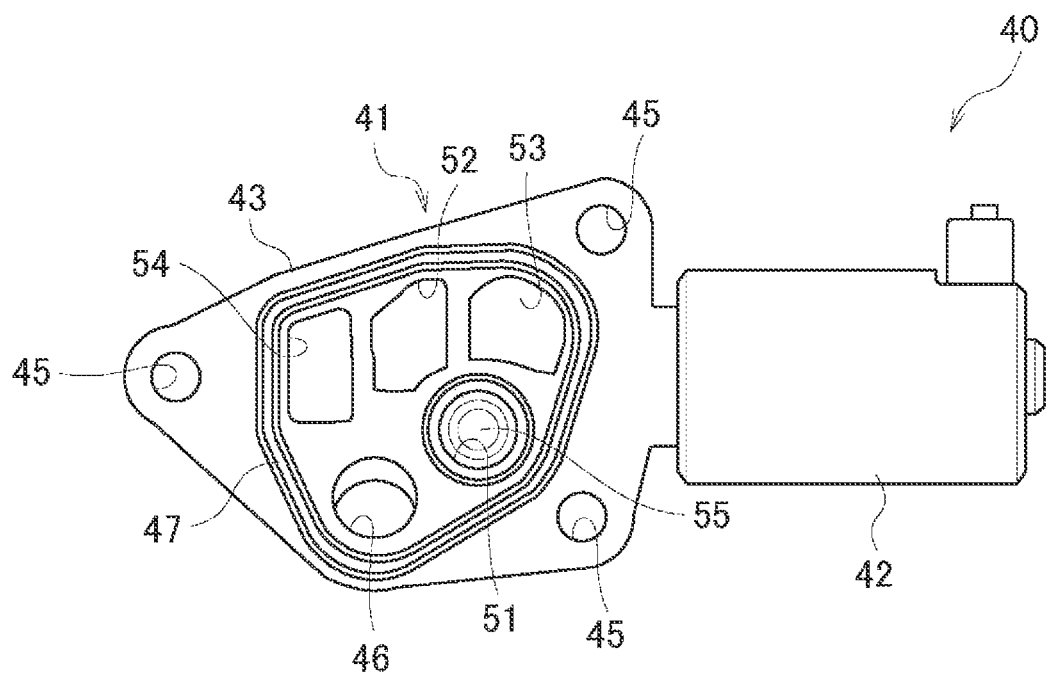

The oil control valve will be described with reference to FIG. 4A and FIG. 4B. FIG. 4A and FIG. 4B are front view and rear view of the oil control valve according to the present embodiment. FIG. 4A shows the front view of the oil control valve, and FIG. 4B shows the rear view of the oil control valve.

As shown in FIG. 4A and FIG. 4B, the valve housing 41 of the oil control valve 40 includes an installation plate 43 installed on the side surface of the cylinder 25, and a cylindrical case 44 bulging outward from the installation plate 43. Fixing holes 45 for screwing are formed at three locations surrounding the cylindrical case 44 on an outer edge of the installation plate 43. In addition, a supply port 46 to which the external pipe 39 (see FIG. 2) is connected is formed on a lower portion of the installation plate 43. The valve spool extending from the solenoid 42 is inserted into the cylindrical case 44. A destination of an oil entering from the supply port 46 is switched by the valve spool.

An O-ring 47 that seals a gap between a rear surface of the installation plate 43 and the side surface of the cylinder 25 is attached to the rear surface of the installation plate 43. The supply port 46, an input port 51, an advance port 52, a retard port 53, and a drain port 54 are formed inside the O-ring 47. The supply port 46 communicates with the input port 51 through an oil passage formed in the cylinder 25. A filter 55 is installed in the input port 51, and the oil is filtered by passing through the filter 55. The input port 51 communicates with any one of the advance port 52, the retard port 53, and the drain port 54 depending on a position of the valve spool.

When the oil enters the input port 51 from the supply port 46, the oil filtered by the filter 55 of the input port 51 is supplied to the cylindrical case 44. By moving the valve spool by the solenoid 42, the input port 51 communicates with one of the advance port 52 and the retard port 53, and the drain port 54 communicates with the other of the advance port 52 and the retard port 53. Accordingly, the oil is supplied from the oil control valve 40 toward one of an advance chamber S1 and a retard chamber S2 of the variable valve device 60 (see FIG. 9) to be described later, and excess oil is discharged toward the oil control valve 40 from the other of the advance chamber S1 and the retard chamber S2.

Figure 5:
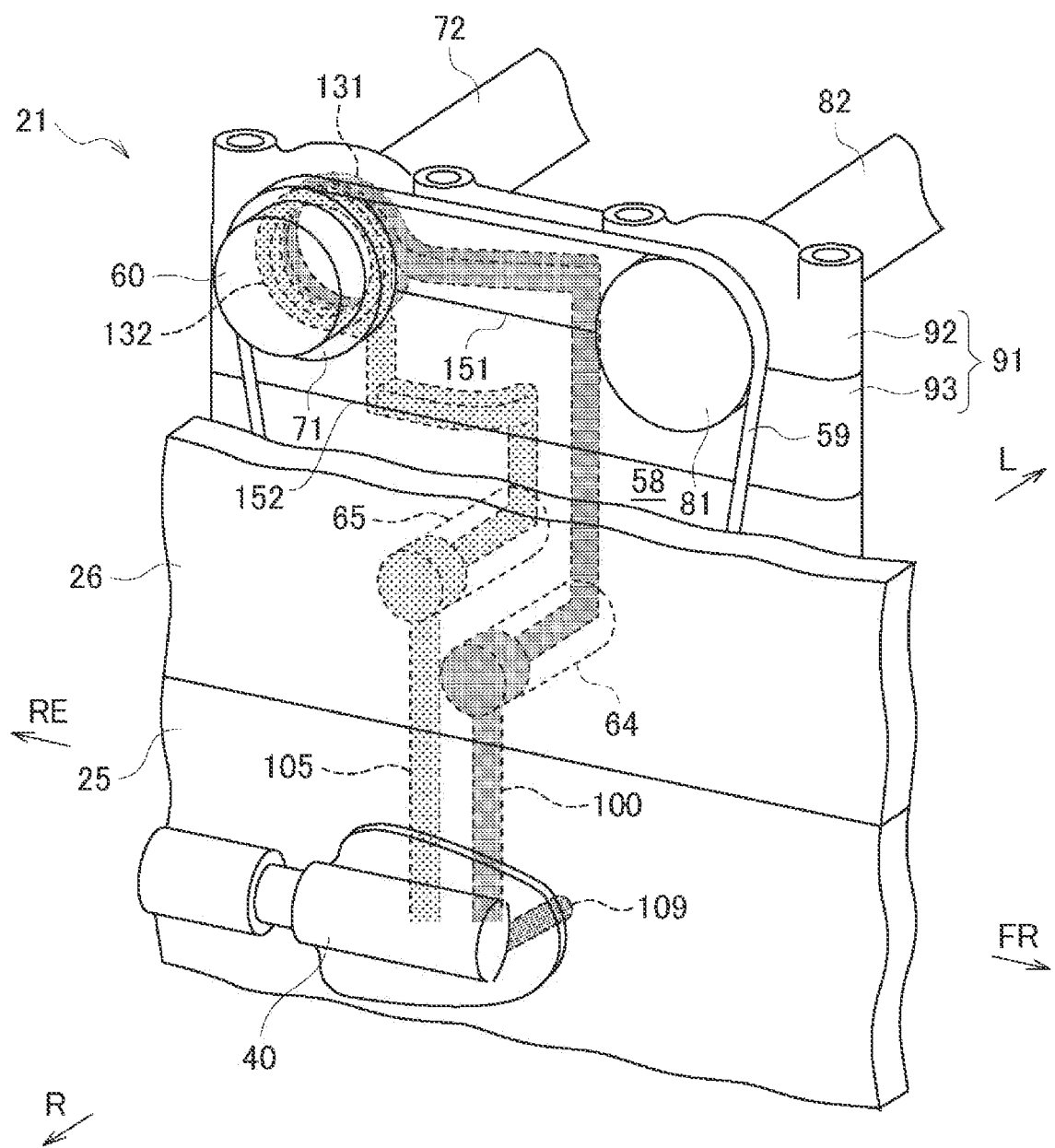
FIG. 5 is a schematic view of an oil passage according to the present embodiment.

The oil passage in the engine will be described with reference to FIG. 5. FIG. 5 is a schematic view of the oil passage according to the present embodiment.

As shown in FIG. 5, the cam chain chamber 58 is formed in the cylinder 25 and cylinder head 26 of the engine 21. A cam chain 59 is housed in the cam chain chamber 58, and is stretched over an intake side cam sprocket 71 and an exhaust side cam sprocket 81. An intake side camshaft 72 is fixed to the intake side cam sprocket 71, and an exhaust side camshaft 82 is fixed to the exhaust side cam sprocket 81. The crankshaft (not shown) is connected to the intake side camshaft 72 and the exhaust side camshaft 82 via the cam chain 59.

The intake side camshaft 72 and the exhaust side camshaft 82 are rotatably supported by a cam housing 91. The cam housing 91 is a support wall fixed on the cylinder head 26, and includes an upper housing 92 that supports upper half portions of the camshafts 72 and 82 and a lower housing 93 that supports lower half portions of the camshafts 72 and 82. The variable valve device 60 is attached to one end of the intake side camshaft 72 inside the cylinder head 26. The variable valve device 60 advances or retards the intake side camshaft 72 based on the oil pressure to change the opening and closing timing of the intake valve (not shown).

The oil control valve 40 is installed on the outer surface (side surface) of the cylinder 25 which is the outer wall of the cam chain chamber 58. The oil control valve 40 controls the oil pressure to the variable valve device 60. An advance passage 100 extends from the advance port 52 (see FIG. 4B) of the oil control valve 40 toward the variable valve device 60, and a retard passage 105 extends from the retard port 53 (see FIG. 4B) of the oil control valve 40 toward the variable valve device 60. The oil for advancing the opening and closing timing of the intake valve passes through the advance passage 100, and the oil for retarding the opening and closing timing of the intake valve passes through the retard passage 105.

The advance passage 100 and the retard passage 105 for oil pressure control enter the outer wall of the cam chain chamber 58 from the oil control valve 40. The advance passage 100 and the retard passage 105 are oriented from a cylinder 25 side to a cylinder head 26 side, then cross the cam chain chamber 58 and are oriented toward the variable valve device 60 through an inner wall of the cam chain chamber 58. In this case, the outer wall of the cam chain chamber 58 is formed by an outer wall of the cylinder 25, an outer wall of the cylinder head 26, and an outer wall of the crankcase 22, and the inner wall of the cam chain chamber 58 is formed by an inner wall of the cylinder 25, an inner wall of the cylinder head 26, an inner wall of the crankcase 22, and the cam housing 91.

The outer wall and the inner wall of the cylinder head 26 are connected by the pair of oil pipes 64 and 65. The pair of oil pipes 64 and 65 cross the cam chain chamber 58 through the inside of the cam chain 59. Since the oil pipes 64 and 65 are detachably installed, the pair of oil pipes 64 and 65 do not become obstacles when the cam chain 59 is assembled. Since the pair of oil pipes 64 and 65 are detachable, the pair of oil pipes 64 and 65 can be inserted after the cam chain 59 is assembled to the engine 21. Accordingly, a dead space inside the cam chain 59 can be effectively utilized.

In the outer wall of the cam chain chamber 58, the advance passage 100 and the retard passage 105 extend from the outer wall of the cylinder 25 toward the outer wall of the cylinder head 26 in parallel with the cylinder axis. In this case, the advance passage 100 is positioned on the front side and the retard passage 105 is positioned on the rear side, and the retard passage 105 extends to a position higher than the advance passage 100. Between the outer wall and the inner wall of the cam chain chamber 58, the advance passage 100 and the retard passage 105 pass through the inside of the pair of oil pipes 64 and 65 and extend in a direction orthogonal to the cylinder axis. Accordingly, the pair of oil pipes 64 and 65 form crossing portions of the advance passage 100 and the retard passage 105.

In the inner wall of the cam chain chamber 58, the advance passage 100 and the retard passage 105 extend from the outer wall of the cylinder head 26 toward the cam housing 91 in parallel with the cylinder axis. The advance passage 100 passes through the lower housing 93 and extends to a mating surface 151 of the lower housing 93 and the upper housing 92, and then is connected to an advance groove 131 from the side through the mating surface 151. The retard passage 105 extends below a retard groove 132 through a mating surface 152 of the cylinder head 26 and the lower housing 93, and then passes through the lower housing 93 to be connected to the retard groove 132 from below. The advance groove 131 and the retard groove 132 are connected to the variable valve device 60 through the intake side camshaft 72.

The advance passage 100 and the retard passage 105 are formed in the cylinder 25 and the cylinder head 26 by a straight passage parallel to the cylinder axis and an orthogonal passage orthogonal to the straight passage. Therefore, a pressure loss of the oil in the advance passage 100 and the retard passage 105 is reduced, and the advance passage 100 and the retard passage 105 can be easily processed with respect to the cylinder 25 and the cylinder head 26. In the cylinder 25 and the cylinder head 26, the advance passage 100 and the retard passage 105 are arranged in parallel. Therefore, the advance passage 100 and the retard passage 105 are brought closer in a front-rear direction, and an increase in a size of the engine 21 is suppressed.

A drain hole 109 (see, in particular, FIG. 9) communicating with the drain port 54 (see FIG. 4B) of the oil control valve 40 is formed on the cylinder 25 side of the outer wall of the cam chain chamber 58. An inner peripheral surface of the cam chain 59 is positioned below the drain hole 109, and the oil is discharged from the drain hole 109 toward the cam chain 59. The oil dropped from the drain hole 109 is supplied to the cam chain 59, and meshing portions of the cam chain 59 with the intake side cam sprocket 71 and the exhaust side cam sprocket 81 are appropriately lubricated, and thus a durability of the cam chain 59 is improved. In addition, no guide or complicated processing for directing the oil to the cam chain 59 is required.

Figure 6:
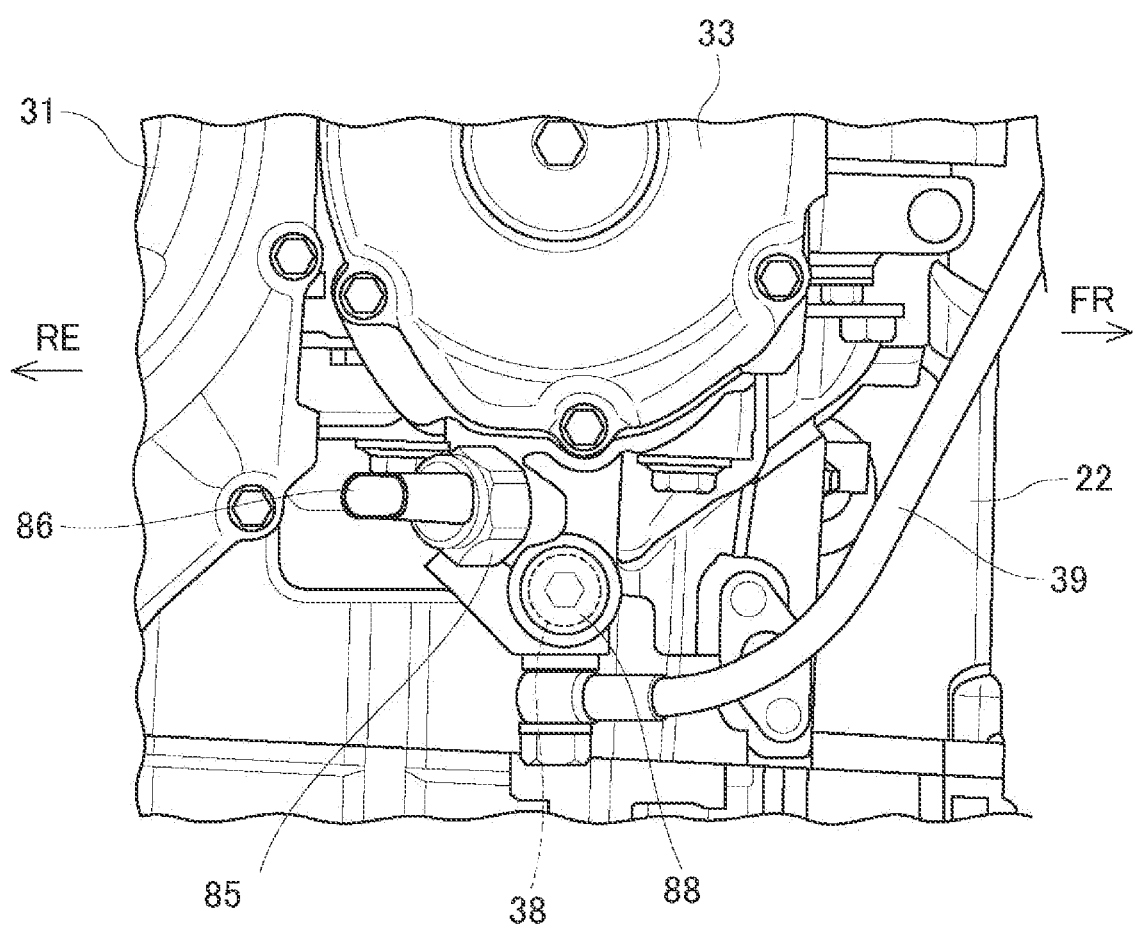
FIG. 6 is a side view of installation positions of an external pipe and an oil pressure sensor according to the present embodiment.
Figure 7:
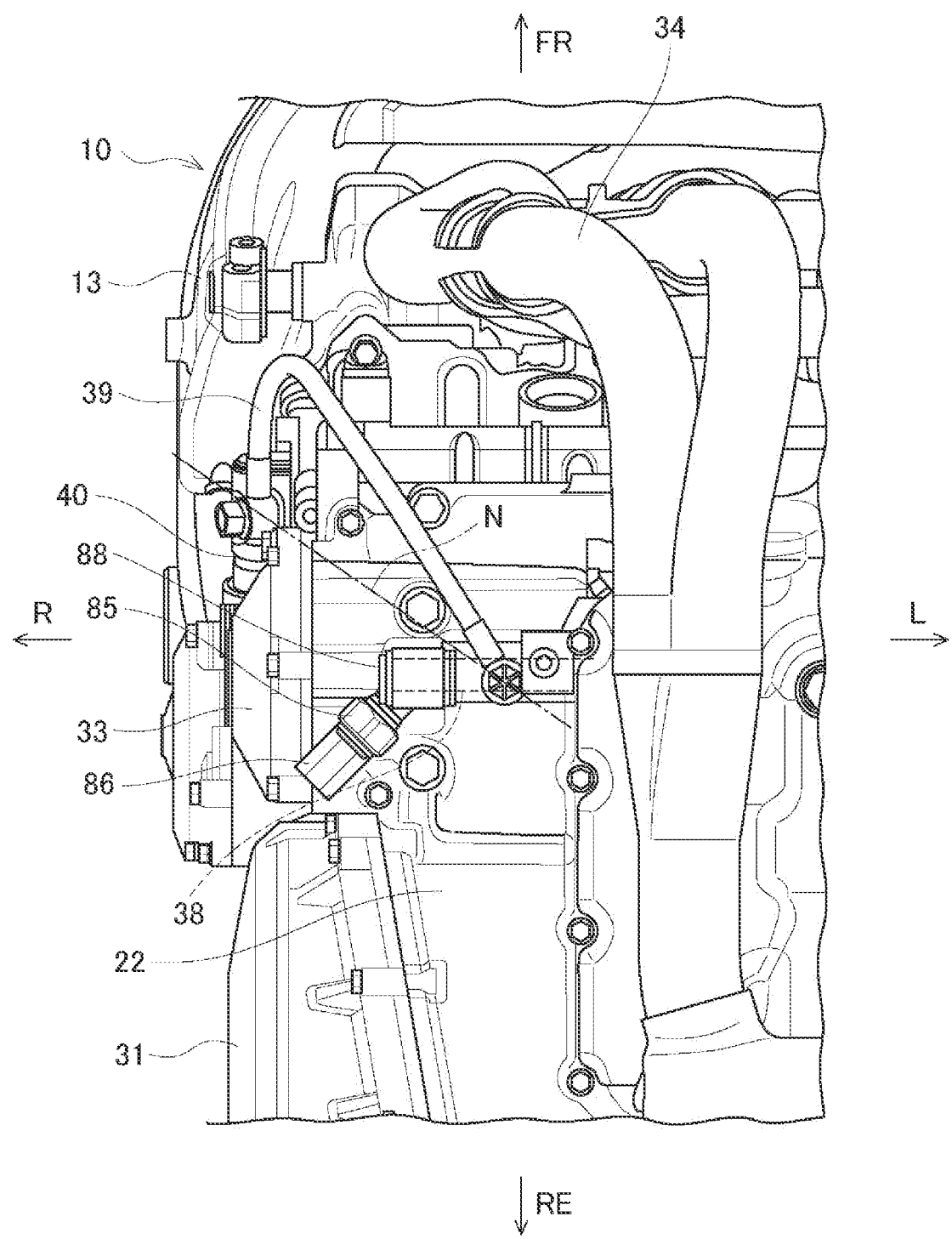
FIG. 7 is a bottom view of the installation positions of the external pipe and the oil pressure sensor according to the present embodiment.
Figure 8:
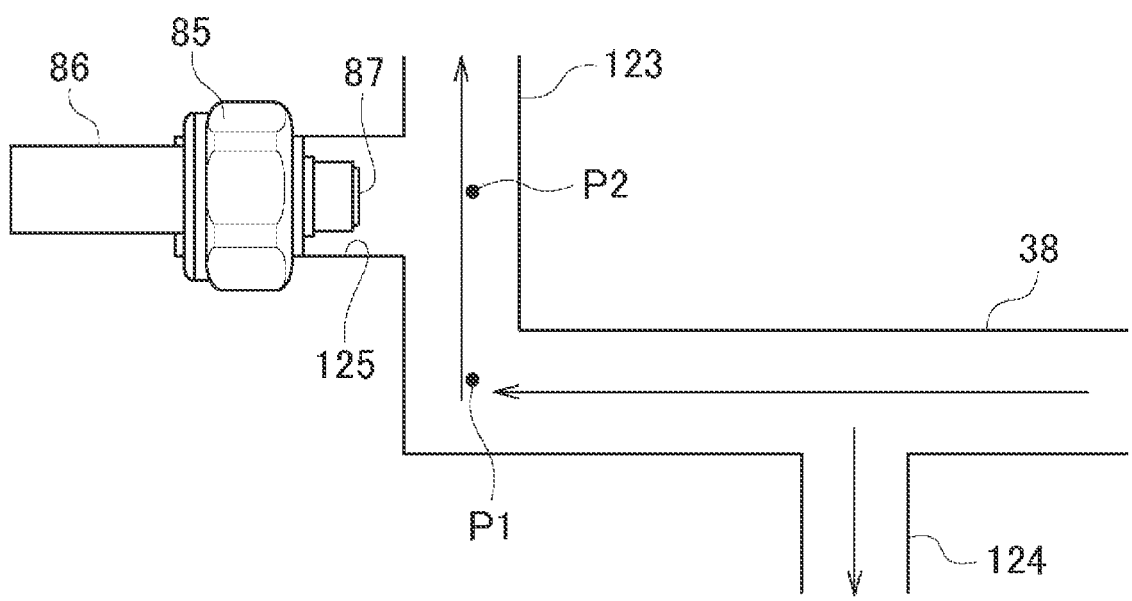
FIG. 8 is a schematic view of an oil passage inside a crankcase according to the present embodiment.

Installation structures of an external pipe and an oil pressure sensor will be described with reference to FIGS. 6 to 8. FIG. 6 is a side view of installation positions of the external pipe and the oil pressure sensor according to the present embodiment. FIG. 7 is a bottom view of the installation positions of the external pipe and the oil pressure sensor according to the present embodiment. FIG. 8 is a schematic view of an oil passage inside a crankcase according to the present embodiment.

As shown in FIGS. 6 and 7, the starter gear cover 33 bulges outward in the vehicle width direction from a side surface of the crankcase 22, and a dead space on a lower side of the starter gear cover 33 is used as an installation space for the oil pressure sensor 85 and the external pipe 39. A plug cap 88 that closes one end of the main gallery 38 is installed on a lower portion of the starter gear cover 33. The one end of the external pipe 39 is connected to the main gallery 38 from the lower side inside the plug cap 88 in the vehicle width direction on a right side of the engine (one side in the vehicle width direction) where the oil control valve 40 is installed.

A branch passage 123 (see FIG. 8) extends upward from the one end of the main gallery 38, and the branch passage 123 is oriented to the journal bearing of the crankshaft. The oil pressure sensor 85 detects an oil pressure in the branch passage 123 on an upper side of the plug cap 88. In this way, in the side view of the vehicle, the oil pressure sensor 85 is positioned above the main gallery 38 and the one end of the external pipe 39 is positioned below the main gallery 38. Since the oil pressure sensor 85 and the one end of the external pipe 39 are installed vertically with the main gallery 38 interposed therebetween, it is easy to secure the bank angle and the like as compared with a case where the oil pressure sensor 85 and the one end of the external pipe 39 are arranged in the vehicle width direction.

As shown in FIG. 7, in the bottom view of the vehicle, the one end of the external pipe 39 overlaps with the crankcase 22, and the oil pressure sensor 85 overlaps with the crankcase 22 on a right side (one side in the vehicle width direction) of the one end of the external pipe 39. An amount of protrusion of the external pipe 39 to the outside in the vehicle width direction is reduced, and most of the oil pressure sensor 85 is housed inside the crankcase 22 in the vehicle width direction, which makes it easier to correspond to the bank angle and the like, and suppresses damage when the vehicle is inverted. Since the oil pressure sensor 85 is installed close to a right side of the crankcase 22, heat damage to the oil pressure sensor 85 by the engine 21 is suppressed, and the oil pressure sensor 85 can be easily attached and detached, thereby improving the maintainability.

In addition, in the bottom view of the vehicle, the external pipe 39 extends from the main gallery 38 to the vehicle front side, and a connector 86 of the oil pressure sensor 85 is oriented to the vehicle rear side. The external pipe 39 extends obliquely forward such that the external pipe 39 is oriented outward in the vehicle width direction, and the oil pressure sensor 85 includes the connector 86 oriented to an obliquely rearward direction facing the outside in the vehicle width direction. Even when a wiring (not shown) is connected to the connector 86 of the oil pressure sensor 85, an extension direction of the wiring of the oil pressure sensor 85 and an extension direction of the external pipe 39 are opposite to each other. Therefore, an oil pressure of the external pipe 39 can be accurately detected by bringing the oil pressure sensor 85 close to the one end of the external pipe 39 without interference between the wiring of the oil pressure sensor 85 and the external pipe 39.

As described above, the one end of the external pipe 39 is connected to the main gallery 38 and the other end of the external pipe 39 is connected to the oil control valve 40. In the bottom view of the vehicle, the oil pressure sensor 85 is positioned between the one end and the other end of the external pipe 39 in the vehicle width direction, and therefore, the oil pressure sensor 85 does not largely protrude outward from the crankcase 22 in the vehicle width direction. Since the oil pressure sensor 85 is positioned on the vehicle rear side relative to a straight line N connecting the one end and the other end of the external pipe 39 in the front-rear direction, the installation space for the oil pressure sensor 85 and the external pipe 39 is divided into front and rear parts of the vehicle, and a degree of freedom in installing the oil pressure sensor 85 and the external pipe 39 is improved, which makes it easier to correspond to the bank angle and the like.

As shown in FIG. 8, the branch passage 123 extends upward from the one end of the main gallery 38, and a branch passage 124 extends downward from a position upstream of the one end of the main gallery 38. The branch passage 123 on an upper side is oriented to the journal bearing and the branch passage 124 on a lower side is oriented to the external pipe 39. The oil pressure sensor 85 is installed in the crankcase 22 such that a detection surface 87 of the oil pressure sensor 85 is exposed in the branch passage 123. A recess 125 is formed in a wall surface of the branch passage 123, and the detection surface 87 of the oil pressure sensor 85 is positioned within the recess 125. In this way, the oil pressure sensor 85 detects an oil pressure near the one end of the main gallery 38.

The detection surface 87 of the oil pressure sensor 85 is oriented in a direction perpendicular to the branch passage 123 at a position P2 away from an intersection position P1 of the main gallery 38 and the branch passage 123. The oil flows from the main gallery 38 toward the branch passages 123 and 124, but a direction of the oil flow in the branch passage 123 and a direction of the detection surface 87 of the oil pressure sensor 85 are orthogonal to each other, and therefore, contaminations in the oil are less likely to adhere to the detection surface 87 of the oil pressure sensor 85. Since the connector 86 is oriented outward in the vehicle width direction, the oil pressure sensor 85 can be easily removed from the crankcase 22, and contaminations can be periodically removed from the detection surface 87 of the oil pressure sensor 85.

Figure 9:
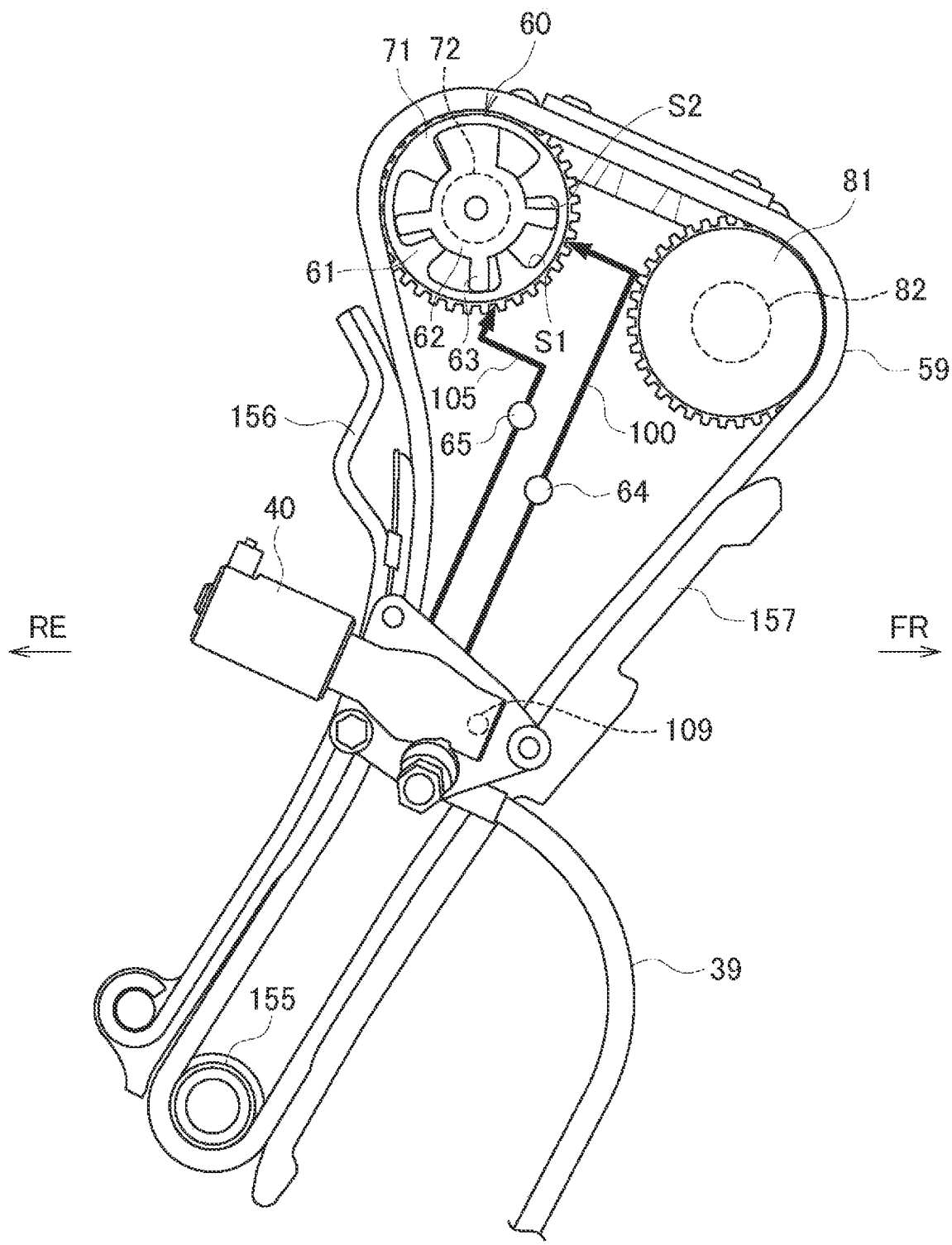
FIG. 9 is a schematic view of a variable valve timing system according to the present embodiment.

A variable valve timing system will be described with reference to FIG. 9. FIG. 9 is a schematic view of the variable valve timing system according to the present embodiment.

As shown in FIG. 9, a drive gear 155 of the cam chain 59 is provided below the oil control valve 40. A crankshaft (not shown) is connected to the drive gear 155 via a gear train. A lower portion of the cam chain 59 is wound around the drive gear 155, and an upper portion of the cam chain 59 is wound around the intake side cam sprocket 71 and the exhaust side cam sprocket 81. As the drive gear 155 rotates to circulate the cam chain 59, the intake side camshaft 72 is rotated integrally with the intake side cam sprocket 71, and the exhaust side camshaft 82 is rotated integrally with the exhaust side cam sprocket 81.

The cam chain 59 is guided by a lever guide 156 and a chain guide 157. The cam chain 59 sent from the drive gear 155 to the intake side cam sprocket 71 is guided by the lever guide 156, and the cam chain 59 drawn to the drive gear 155 from the exhaust side cam sprocket 81 is guided by the chain guide 157. Since slack is produced in the cam chain 59 extending from the drive gear 155 to the intake side cam sprocket 71, a chain tensioner (not shown) presses the lever guide 156 against the cam chain 59 to give a tension to the cam chain 59.

The intake valve and an exhaust valve are opened and closed by the rotation of the intake side camshaft 72 and the exhaust side camshaft 82, but the opening and closing timing of the intake valve is changed by the variable valve timing system. The variable valve timing system is provided with the variable valve device 60 which changes a relative rotational phase of the intake side camshaft 72 with respect to the crankshaft. The variable valve device 60 includes a case 61 fixed to the intake side cam sprocket 71 and an inner rotor 62 fixed to the intake side camshaft 72. The inner rotor 62 is relatively rotatably housed inside the case 61.

A plurality of oil pressure chambers are formed in the case 61 of the variable valve device 60, and a plurality of vanes 63 extend radially outward from the inner rotor 62. Each vane 63 of the inner rotor 62 is housed in each oil pressure chamber of the case 61, and each oil pressure chamber is partitioned by the vane 63 into the advance chamber S1 and the retard chamber S2. When a volume of the advance chamber S1 is increased by the oil pressure, the inner rotor 62 is relatively rotated to an advance side relative to the case 61, and the intake side camshaft 72 is advanced. When a volume of the retard chamber S2 is increased by the oil pressure, the inner rotor 62 is relatively rotated to a retard side relative to the case 61, and the intake side camshaft 72 is retarded.

The variable valve device 60 is operated by the oil pressure from the oil control valve 40. The oil is supplied from the main gallery 38 (see FIG. 2) to the oil control valve 40 through the external pipe 39. According to a communication state between the ports of the oil control valve 40, an oil supply destination from the oil control valve 40 is switched between the advance chamber S1 and the retard chamber S2 of the variable valve device 60. The oil is supplied from the oil control valve 40 to the advance chamber S1 through the advance passage 100, and the oil is supplied from the oil control valve 40 to the retard chamber S2 through the retard passage 105.

As described above, the advance passage 100 and the retard passage 105 cross the cam chain chamber 58 (see FIG. 6), and the oil pipes 64 and 65 are used to cross the cam chain chamber 58. The oil pipes 64 and 65 are installed inside the cam chain 59 between the lever guide 156 and the chain guide 157. The oil pipes 64 and 65 are arranged in a front-rear direction while being separated from each other in an up-down direction, and an installation region of the oil pipes 64 and 65 is narrowed and the oil pipes 64 and 65 are installed inside the cam chain 59 with ample space. Even when the cam chain 59 is pushed by the lever guide 156, the cam chain 59 does not interfere with the oil pipes 64 and 65.

As described above, according to the present embodiment, since the connector 86 is oriented to the outside of the vehicle at one end side of the main gallery 38, the oil pressure sensor 85 can be easily removed from the crankcase 22. By periodically removing the contaminations adhering to the oil pressure sensor 85, detection accuracy of the oil pressure sensor 85 can be improved. In addition, since the connector 86 of the oil pressure sensor 85 overlaps with the crankcase 22, it is possible to suppress the oil pressure sensor 85 from being damaged when the vehicle is inverted.

In the present embodiment, a direction of the detection surface of the oil pressure sensor and a direction of the oil flow in the branch passage are orthogonal to each other to suppress the contaminations from adhering to the detection surface of the oil pressure sensor, but it is difficult to sufficiently suppress the contaminations from adhering to the detection surface of the oil pressure sensor. When the contaminations adhere to the detection surface of the oil pressure sensor, the detection accuracy of the oil pressure sensor may be reduced. Therefore, as shown in a modification of FIG. 10A, an oil pressure sensor 161 with a mesh strainer 166 may be used.

Figure 10A:
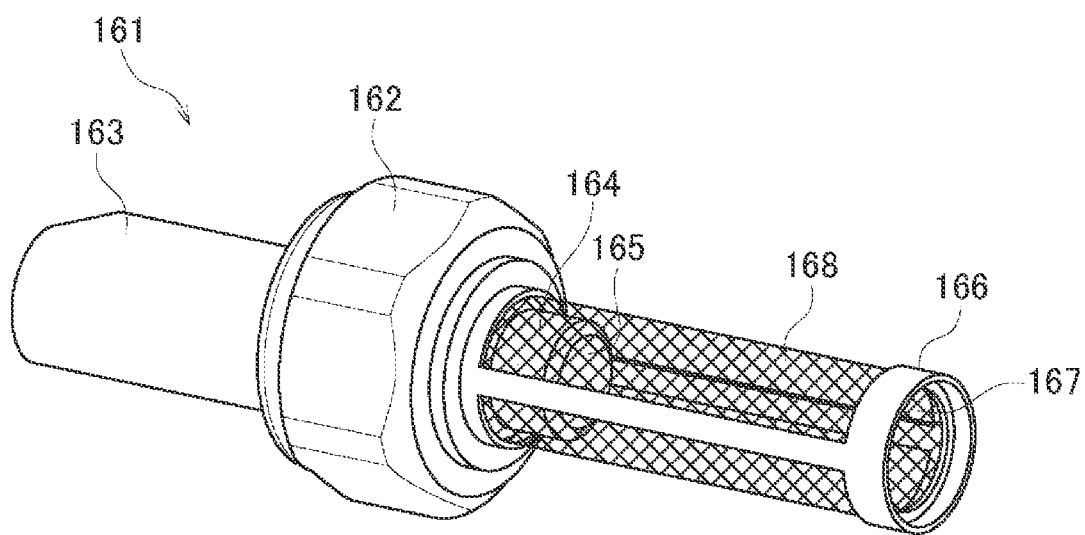
FIG. 10A and FIG. 10B each is a perspective view of an oil pressure sensor according to a modification.

As shown in FIG. 10A, the oil pressure sensor 161 includes a sensor main body 162 having a hexagonal head shape that is gripped by a tool or the like, a connector 163 provided on one end side of the sensor main body 162, and a detection portion 164 protruding from the other end side of the sensor main body 162. The cylindrical strainer 166 is attached to the other end side of the sensor main body 162 so as to surround the detection portion 164. A coarse mesh 167 is formed on a tip end surface of the strainer 166, and a mesh 168 that is finer than the mesh 167 formed on the tip end surface is formed on an outer peripheral surface of the strainer 166. Such an oil pressure sensor 161 is preferably used in an oil passage branched in a T-shape in the crankcase 22.

Figure 11:
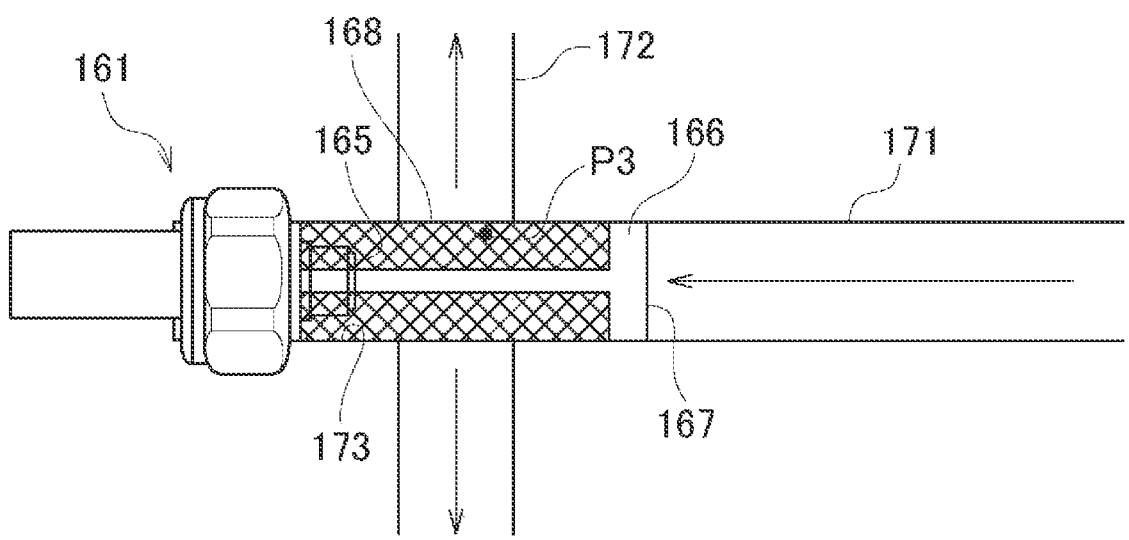
FIG. 11 is a schematic view of an oil passage inside a crankcase according to a modification.

As shown in FIG. 11, a branch passage 172 extends in an up-down direction from one end of a main gallery 171. An upper side of the branch passage 172 is oriented to the journal bearing and a lower side of the branch passage 172 is oriented to the external pipe 39. A recess 173 is formed in an outer peripheral surface of the branch passage 172 so as to face the main gallery 171 at an intersection position P3 of the main gallery 171 and the branch passage 172. A detection surface 165 of the oil pressure sensor 161 is positioned within the recess 173, and the detection surface 165 of the oil pressure sensor 161 is oriented to the main gallery 171. The oil pressure sensor 161 is provided with the strainer 166 that crosses the branch passage 172 and enters the main gallery 171.

The oil in the main gallery 171 is filtered by the strainer 166 to suppress the contaminations from adhering to the detection surface 165 of the oil pressure sensor 161, and the oil in the branch passage 172 is filtered to suppress the contaminations from entering the journal bearing. In this case, the mesh 167 on the tip end surface of the strainer 166 installed in the main gallery 171 is formed coarser than the mesh 168 on the outer peripheral surface of the strainer 166 installed in the branch passage 172. The oil is filtered by the meshes 167 and 168 in a stepwise manner while the oil flows from the main gallery 171 to the branch passage 172. Therefore, contaminations are effectively removed from the oil while a pressure loss in the passage is reduced.

Figure 10B:
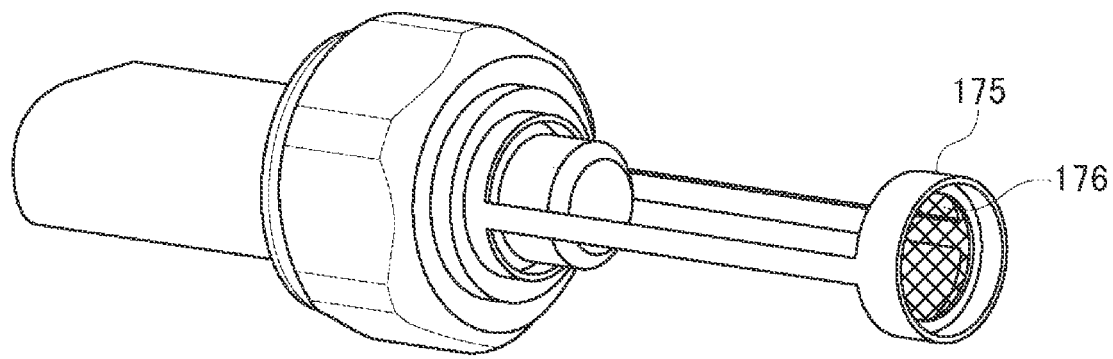

In addition, as shown in FIG. 10B, a mesh 176 may be formed only on a tip end surface of a strainer 175. In this case, the mesh 176 is formed on the tip end surface of the strainer 175 installed in the main gallery 171, and an outer peripheral surface of the strainer 175 installed in the branch passage 172 is opened. With such a configuration, contaminations can be removed from the oil in the main gallery 171 while a pressure loss in the passage can be reduced.

In addition, the oil pressure sensor is not provided with a strainer in the present embodiment, but the oil pressure sensor may be provided with a strainer. In this case, the detection surface of the oil pressure sensor is positioned within a recess of a branch passage, and the strainer is provided on the oil pressure sensor so as to protrude from the recess into a branch passage. Accordingly, oil in the branch passage is filtered by the strainer to suppress contaminations from adhering to the detection surface of the oil pressure sensor and to suppress the contaminations from entering the journal bearing.

In addition, the parallel 4-cylinder engine is exemplified as the engine in the present embodiment, but a type of the engine is not particularly limited.

In addition, a twin spar frame is exemplified as a vehicle body frame in the present embodiment, but a type of the vehicle body frame is not particularly limited as long as the vehicle body frame can suspend the cylinder head. For example, the vehicle body frame may be a cradle frame or a diamond frame.

In addition, the oil control valve is installed on the right side surface of the engine in the present embodiment, but the oil control valve may be installed on a left side surface of the engine.

In addition, the oil control valve is installed on the outer surface of the cylinder in the present embodiment, but the oil control valve may be installed on the outer surface of the engine. For example, the oil control valve may be installed on the outer surface of the crankcase.

In addition, the solenoid valve is exemplified as the oil control valve in the present embodiment, but a type of the oil control valve is not particularly limited as long as the oil control valve is a valve that can control the oil pressure to the variable valve device.

In addition, the intake side camshaft is provided with the variable valve device in the present embodiment, but at least one of the intake side camshaft and the exhaust side camshaft may be provided with the variable valve device.

In addition, the oil control valve and the main gallery are connected by the external pipe in the present embodiment, but the oil control valve and the main gallery may be connected by the oil passage in the engine.

In addition, the detachable oil pipes form a passage crossing the cam chain chamber in the present embodiment, but the passage crossing the cam chain chamber may be formed so as to allow the oil to move between the inner wall and the outer wall of the cam chain chamber. For example, one of the inner wall and the outer wall of the cylinder head may protrude toward the other side to form the passage crossing the cam chain chamber.

In addition, the advance passage and the retard passage are partially formed in parallel in the present embodiment, but the advance passage and the retard passage may be formed non-parallel to each other as a whole as long as a size of the engine is large enough.

In addition, the oil control valve is installed so as not to overlap with the bolt on the outer surface of the cylinder in the present embodiment, but the oil control valve may overlap with the bolt as long as the oil control valve does not protrude excessively from the outer surface of the engine.

In addition, the oil pipe and the plug cap are formed separately in the present embodiment, but the oil pipe and the plug cap may be formed integrally.

In addition, a region surrounded by the main frame, the down frame, and the lower surface of the cylinder head is formed in a triangle shape in the present embodiment, but a shape of the region surrounded by the main frame, the down frame, and the lower surface of the cylinder head is not particularly limited.

In addition, the external pipe extends from the main gallery to the vehicle front side and the connector of the oil pressure sensor is oriented to the vehicle rear side in the present embodiment, but the connector of the oil pressure sensor may be oriented in the extension direction of the external pipe as long as the external pipe and the wiring of the oil pressure sensor do not interfere with each other.

In addition, the one end of the external pipe is covered with the exhaust pipe from the front in the front view of the vehicle in the present embodiment, but the one end of the external pipe may be exposed from the exhaust pipe in the front view of the vehicle.

In addition, the connector of the oil pressure sensor is oriented to the obliquely rearward direction in the present embodiment, but a direction of the connector of the oil pressure sensor is not particularly limited as long as the connector of the oil pressure sensor is oriented to the outside of the vehicle.

In addition, the variable valve timing system may be applied not only to the shown straddle-type vehicle, but also to other types of straddle-type vehicles. The straddle-type vehicle is not limited to general vehicles on which a rider rides in a posture of straddling a seat, and also includes a small-sized scooter-type vehicle on which a rider rides without straddling a seat.

As described above, an installation structure for an oil pressure sensor according to the present embodiment includes a crankcase (22) in which a main gallery (38) that extends in one direction is formed, and the oil pressure sensor (85) detachably installed on an outer surface of the crankcase. The oil pressure sensor is configured to detect an oil pressure of a branch passage (123) branching from one end of the main gallery. In a bottom view of a vehicle, a connector (86) of the oil pressure sensor is oriented to an outside of the vehicle, and the connector of the oil pressure sensor overlaps with the crankcase. According to this configuration, since the connector is oriented to the outside of the vehicle on one end side of the main gallery, the oil pressure sensor can be easily removed from the crankcase. By periodically removing contaminations adhering to the oil pressure sensor, detection accuracy of the oil pressure sensor can be improved. In addition, since the connector of the oil pressure sensor overlaps with the crankcase, it is possible to suppress the oil pressure sensor from being damaged when the vehicle is inverted.

In the installation structure for the oil pressure sensor according to the present embodiment, a detection surface (87) of the oil pressure sensor is oriented in a direction perpendicular to the branch passage at a position (P2) away from an intersection position (P1) of the main gallery and the branch passage. According to this configuration, since a direction of the oil flow in the branch passage and a direction of the detection surface of the oil pressure sensor are orthogonal to each other, contaminations in the oil can be suppressed from adhering to the detection surface of the oil pressure sensor.

In the installation structure for the oil pressure sensor according to the present embodiment, a recess (125) is formed in a wall surface of the branch passage, and a detection surface of the oil pressure sensor is positioned within the recess, and the oil pressure sensor is provided with a strainer protruding from the recess into the branch passage. According to this configuration, the oil in the branch passage is filtered by the strainer to suppress the contaminations from adhering to the detection surface of the oil pressure sensor and to suppress the contaminations from entering a lubrication component located downstream of the branch passage.

In the installation structure for the oil pressure sensor according to the present embodiment, a detection surface (165) of the oil pressure sensor (161) is oriented to the main gallery at an intersection position (P3) of the main gallery (171) and the branch passage (172), and the oil pressure sensor is provided with a strainer (166) that crosses the branch passage and enters the main gallery. According to this configuration, the oil in the main gallery is filtered by the strainer to suppress the contaminations from adhering to the detection surface of the oil pressure sensor, and the oil in the branch passage is filtered to suppress the contaminations from entering the lubrication component located downstream of the branch passage.

In the installation structure for the oil pressure sensor according to the present embodiment, the strainer is formed in a cylindrical shape, and a mesh (167) formed on a tip end surface of the strainer installed in the main gallery is formed coarser than a mesh (168) formed on an outer peripheral surface of the strainer installed in the branch passage. According to this configuration, the oil is filtered by the meshes of the strainer in a stepwise manner while the oil flows from the main gallery to the branch passage. Therefore, the contaminations can be effectively removed from the oil while pressure losses in the main gallery and the branch passage can be reduced.

In the installation structure for the oil pressure sensor according to the present embodiment, the strainer (175) is formed in a cylindrical shape, a mesh (176) is formed on a tip end surface of the strainer installed in the main gallery (171), and an outer peripheral surface of the strainer installed in the branch passage (172) is opened. According to this configuration, the contaminations can be removed from the oil in the main gallery while a pressure loss in the passage can be reduced.

Although the present embodiment has been described, the above-described embodiment and modification may be combined entirely or partially as another embodiment.

In addition, the technique of the present invention is not limited to the above-described embodiment, and various changes, substitutions, and modifications may be made without departing from the spirit of the technical concept of the present invention. The present invention may be implemented by other methods as long as the technical concept can be implemented by the methods through advance of the technique or other derivative techniques. Therefore, claims cover all embodiments that may be included within the scope of the technical concept.

What is claimed is:

1. An installation structure for an oil pressure sensor, comprising:
    a crankcase in which a main gallery that extends in one direction is formed; and
    the oil pressure sensor detachably installed on an outer surface of the crankcase, wherein
    the oil pressure sensor is configured to detect an oil pressure of a branch passage branching from one end of the main gallery,
    in a bottom view of a vehicle, a connector of the oil pressure sensor is oriented to an outside of the vehicle, and the connector of the oil pressure sensor overlaps with the crankcase,
    a detection surface of the oil pressure sensor is oriented to the intersection position of the main gallery and the branch passage,
    the oil pressure sensor is provided with a strainer that crosses the branch passage and enters the main gallery, and
    the strainer is formed in a cylindrical shape, and a mesh formed on a tip end surface of the strainer installed in the main gallery is formed coarser than a mesh formed on an outer peripheral surface of the strainer installed in the branch passage.

2. The installation structure according to claim 1, wherein a detection surface of the oil pressure sensor is oriented in a direction perpendicular to the branch passage at a position away from an intersection position of the main gallery and the branch passage.

3. The installation structure according to claim 1, wherein a recess is formed in a wall surface of the branch passage, and a detection surface of the oil pressure sensor is positioned within the recess, and the oil pressure sensor is provided with a strainer protruding from the recess into the branch passage.

4. An installation structure for an oil pressure sensor, comprising:
    a crankcase in which a main gallery that extends in one direction is formed; and
    the oil pressure sensor detachably installed on an outer surface of the crankcase, wherein
    the oil pressure sensor is configured to detect an oil pressure of a branch passage branching from one end of the main gallery,
    in a bottom view of a vehicle, a connector of the oil pressure sensor is oriented to an outside of the vehicle, and the connector of the oil pressure sensor overlaps with the crankcase, a detection surface of the oil pressure sensor is oriented to the main gallery at an intersection position of the main gallery and the branch passage, the oil pressure sensor is provided with a strainer that crosses the branch passage and enters the main gallery, and the strainer is formed in a cylindrical shape, a mesh is formed on a tip end surface of the strainer installed in the main gallery, and an outer peripheral surface of the strainer installed in the branch passage is opened.

5. The installation structure according to claim 4, wherein a detection surface of the oil pressure sensor is oriented in a direction perpendicular to the branch passage at a position away from an intersection position of the main gallery and the branch passage.

6. The installation structure according to claim 4, wherein a recess is formed in a wall surface of the branch passage, and a detection surface of the oil pressure sensor is positioned within the recess, and the oil pressure sensor is provided with a strainer protruding from the recess into the branch passage.

* * * * *